April 28, 1936.    R. S. BEGG    2,038,707
BRAKE
Filed June 10, 1931    2 Sheets-Sheet 1

Inventor
RUSSELL S. BEGG.
By Richey & Watts
Attorney

April 28, 1936.  R. S. BEGG  2,038,707
BRAKE
Filed June 10, 1931  2 Sheets-Sheet 2
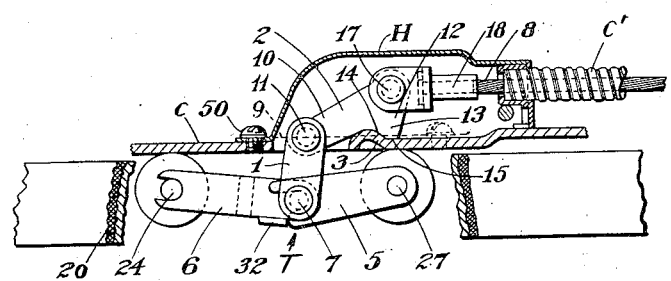
Fig.4
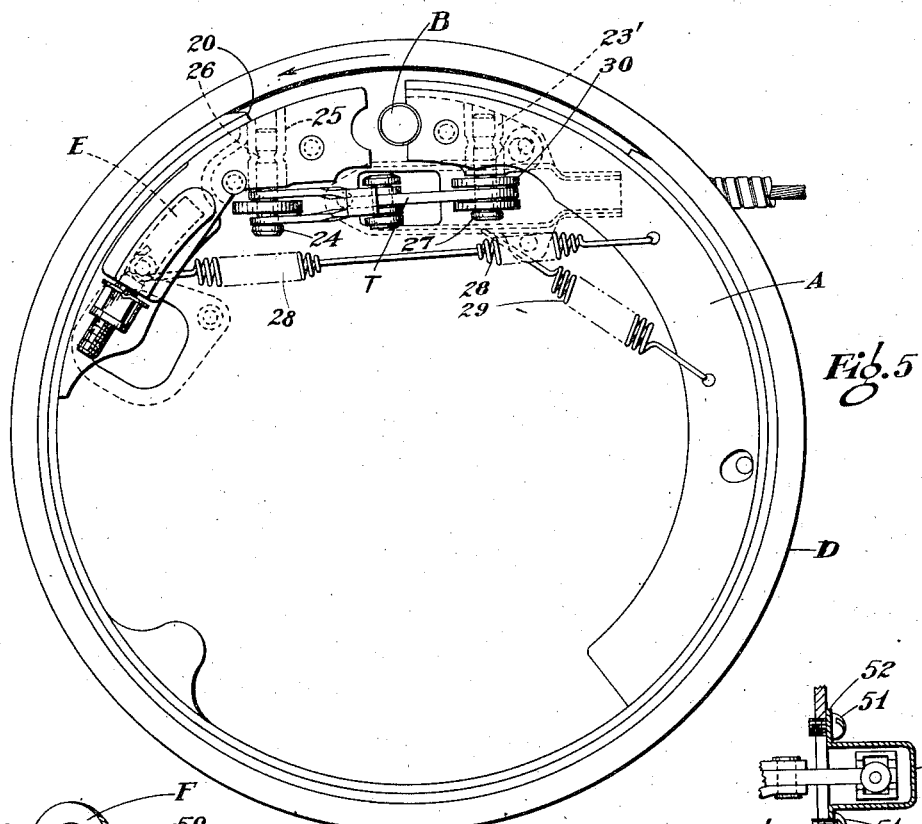
Fig.5
Fig.7
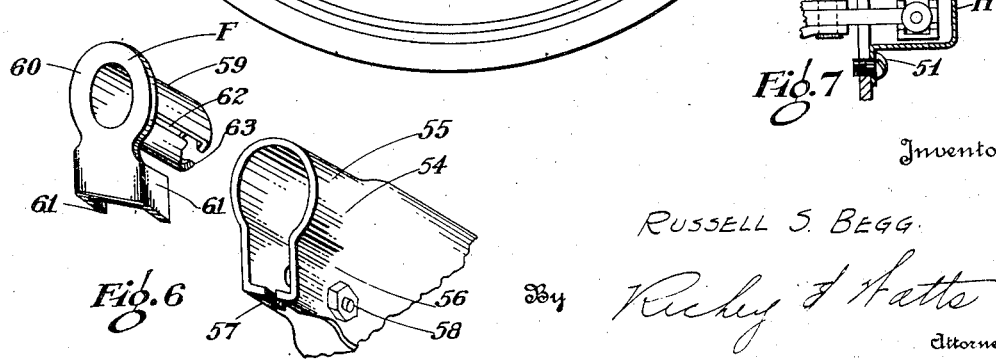
Fig.6
Inventor
RUSSELL S. BEGG.
By Richey & Watts
Attorney Patented Apr. 28, 1936

2,038,707

UNITED STATES PATENT OFFICE 2,038,707

BRAKE

Russell S. Begg, Cleveland, Ohio, assignor to The Midland Steel Products Company, Cleveland, Ohio, a corporation of Ohio, as trustee for Steeldraulic Brake Corporation Application June 10, 1931, Serial No. 543,312

30 Claims. (Cl. 188—78)

This invention relates to vehicle brakes and has to do more particularly with that type of brake which includes a full floating internal brake shoe adapted to be expanded by cable actuated spreading mechanism.

More specifically this invention is directed to the provision of a cable actuated brake expanding mechanism that includes a horizontally acting toggle arranged between the shoe ends adapted to be spread by means of a linkage consisting of a link pivotally connected to the center pin of the toggle and to one arm of a bell crank lever having a sliding pivot on an upset portion of the apron. The other arm of the crank which lies exteriorly of the brake drum is connected to the brake operating cable arranged alongside the apron and also exteriorly of the drum. The exposed parts of the cable and bell crank are protected from the elements by means of a dust housing that is of novel form and provides a firm secure seat for the end of the cable conduit.

In addition, this invention contemplates a novel arrangement of the thrust pins connecting the ends of the brake shoe to the toggle mechanism, wherein one of the pins is set at an angle to the other with the shoe in unexpanded position, the theory being that when the shoe moves toward expanded position the pins will tend to assume parallel positions to thereby relieve binding on the toggle at the instant of greatest expansive effort to thereby reduce friction and wear or binding of the pins with the ends of the toggle.

One object of this invention is to provide a brake expanding mechanism that is made up of a minimum of parts yet is simple and efficient in operation and may be readily assembled. Another object is to provide a vehicle brake wherein the cable for operating the brake expanding means is operatively connected to the brake expanding device exteriorly of the drum and is arranged to lie alongside the apron and in a plane parallel thereto. Another object is to provide a novel form of dust housing for enclosing the exposed parts of the brake expanding mechanism and the actuating cable. Another object is to provide a fitting in the dust housing for receiving one end of the cable conduit wherein such conduit end is securely and firmly gripped and is prevented from withdrawal therefrom. Another object is to facilitate the operation of the spreading mechanism by relieving binding and shearing stresses on the thrust pins. Another object is to make for a relatively short length of cable between the pull rod and the brake actuating mechanism.

Figure 4 is a detail of the linkage shown in Fig. 2, with the toggle expanded.

Figure 5 is a plan view of the brake shown in Fig. 3 illustrating the parallel relation of the thrust pins connecting the toggle ends to the shoe ends when the shoe is expanded.

Figure 6 is a perspective view of one end of the dust housing showing the end fitting for the cable conduit.

Figure 7 is a vertical transverse section through the dust housing.

Figure 1:
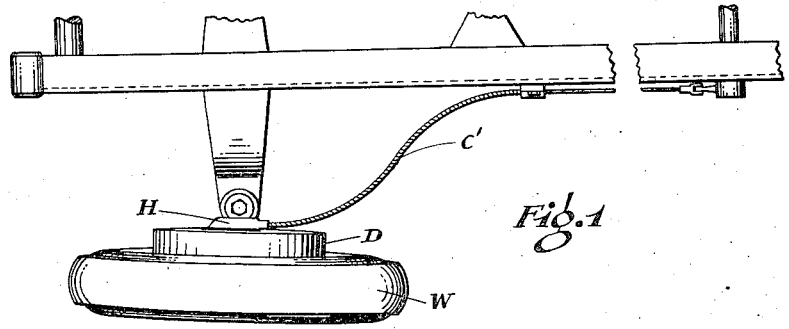
Figure 1 is a detail of one of the front wheels of a vehicle showing the arrangement of the brake operating cable and conduit alongside the apron.

Referring to the drawings, I have illustrated my invention associated with a brake mechanism which includes a full floating internal expanding brake shoe A having separable ends and an anchor B against which the shoe ends abut mounted on the apron C that closes the open face of the brake drum D, mounted to rotate within the swiveling wheel W. One of the shoe ends is provided with an adjustor E that is circumferentially adjustable with relation thereto to vary the effective length of the shoe, thereby compensating for wear of the brake lining. The toggle mechanism T for spreading the shoe is arranged between the adjustor and the opposite end of the shoe and serves to force such ends apart and expand the brake ring into engagement with the drum. The mid portion of the toggle is connected to a link 1, which is in turn pivotally connected to one end of a bell crank lever 2 that has a sliding pivot as at 3 on the outer side of the brake apron C. All of the parts just mentioned are enclosed and protected from the elements either by reason of their position within the drum or by means of a housing H mounted on the apron and adapted to protect the parts operating thereunder from dust and dirt. The linkage just described is actuated to spread the toggle by means of a flexible cable attached to that end of the bell crank which works exteriorly of the drum, thereby permitting the connection to be effected outside the apron. The other end of the cable is attached to a brake rod and extends through a conduit C' seated at one end in a fitting F, Fig. 6, provided therefor in the dust housing.

The brake shown is preferably made up of T-section stock rolled into a split ring having separable ends. The radial flange of the ring may be cut away at various points, as shown, to impart varying degrees of flexibility to various sections of the brake shoe. An adjustor E is mounted at one end of the ring having an arcuate surface 20 engaging the inner side of the lining supporting part of the shoe.

Figure 3:
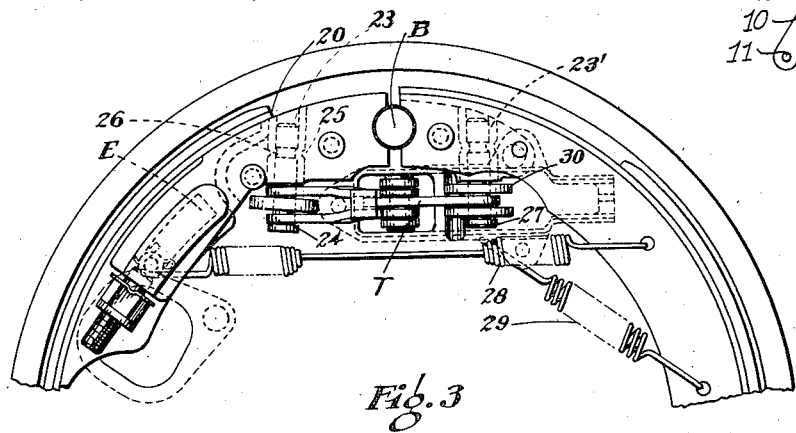
Figure 3 is a plan view of a vehicle brake showing the non-parallel relation of the thrust pins connecting the expanding mechanism to the shoe ends when the shoe is in inoperative position.
Figure 8:
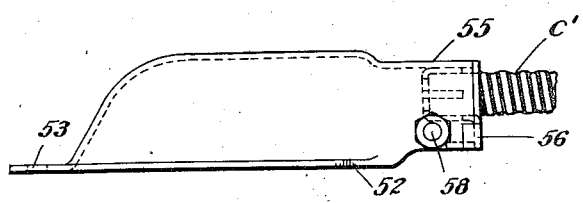
Figure 8 is a view of the dust housing.

The adjustor is made up of two plates 21 and 22, the plate 22 being deformed to provide a tubular opening 23 (Fig. 3) that rests at an angle to the vertical when the shoe is in a position of rest. This opening 23 is adapted to receive and support a thrust pin 24. The pin is retained therein by compressing an internally protuberant rib 25 in the stock which makes a bearing with a groove 26 in the pin. Likewise, the radial rib at the opposing end of the shoe is deformed to provide a similar tubular opening 23' that supports a thrust pin 27 in the manner just described. Thus there are arranged at both ends of the shoe two thrust pins, one of which is set at an angle to the other when the shoe is in operative position with both of the ends resting against the anchor. The purpose of this will be hereinafter described.

The pins 24 and 27 perform a dual purpose of engaging the ends of the toggle and of carrying rollers for spacing the shoe ends laterally from the apron. Each pin is provided with an enlarged head and the pin 27 carries a freely rotating pair of rollers 30, one above and one below the male toggle arm 5. The pin 24 has an enlarged head and carries a single roller 31 and pivotally and slidably receives above and below the roller, the bifurcated ends of the female toggle arm 6. It will be noted that the angle of the pin 24 causes the roller to bear against the toggle arm, but as the arm forces the shoe end outwardly, the pin tends to assume a vertical position thus withdrawing the roller from contact therewith.

The inner ends of the toggle arms engage a common pivot pin 7, the inner end of the arm 6 being pivotally connected thereto and the male arm 5, having its inner end bifurcated to permit of both pivotal and sliding connection. In the position shown in Fig. 4, it will be appreciated that the toggle is approaching dead center and continued movement might pull the toggle over dead center. However, the extreme inner end of the male arm 5 engages a connecting portion 32 of the female arm 6 and further inward movement of the yoke changes the pivot point of the toggle from the axis of the pin 7 to the point of contact between the arm 5 and the connecting portions 32.

As mentioned, the inner ends of the toggle arms engage the pivot pin 7 which in turn is engaged by a link 1 connected to the bell crank 2 which is in turn connected to an actuating cable 8. Tension on the cable tends to flatten the toggle and spread the shoe ends and at the same time exerts a lateral force on the pins 24 and 27 in the direction of the apron. When the drum is rotated counterclockwise which is the intended rotation for forward movement of the vehicle, spreading the toggle is intended to force the more flexible end of the shoe away from the anchor and into engagement with the drum so that the flexible part of the shoe "serves" the reinforced part. On the other hand, when the vehicle is moved backward the friction between the drum and the shoe causes the reinforced part to serve the flexible part and the braking torque will be taken through the adjustor. Hence, if the right side of the band (Fig. 5) remains stationary, the opposing side of the band moves out toward the brake drum which causes the pin 24 to be moved toward a position of parallelism with the opposing pin until such time as the shoe is fully expanded at which time, the pins should be parallel. It will be noted that every fraction of movement toward such parallel position tends to progressively decrease the severity of the frictional engagement between the pin and toggle arm, thus reducing the hazard of shearing or bending the pin and providing an easier acting toggle. On the other hand, during the application of the brake, if the left side of the shoe remains stationary and the right side moves out, the pin 27 tends to move toward angular position until such time as it parallels the other pin, so that when the toggle is spread to its greatest extent, there is no binding between the toggle arms and the thrust pins.

Returning to the toggle actuating linkage which forms the major precept of this invention, one end of the link 1 extends through a suitable opening 9 in the apron C which is sufficiently elongated to permit the link to float back and forth in accordance with the movement of the shoe depending, of course, on the direction of drum rotation. The link is pivotally connected to one end 10 of the bell crank by means of a pin 11. The other end of the bell crank designated at 12 is provided with an offset 13 having an arcuate groove 14 in the marginal edge adapted to cooperate with the upset arcuate portion 3 formed at one end of the slot 9 in the apron C. A stop 15 adjoins the arcuate groove 14 and is adapted to contact with the planular surface of the apron immediately in rear of the upset portion 3 to limit the movement of the bell crank.

This end 12 of the bell crank is also attached to a flexible cable 8 by means of yoke 18 that engages a pin 17 carried by the arm that is spaced from and aligns with the pin 11. The cable, of course, may be secured to the yoke in any manner desired, although as shown, a tubular sleeve 18 is provided as a part of the yoke assembly through which the cable end extends and is secured on the opposing side thereof.

Figure 2:
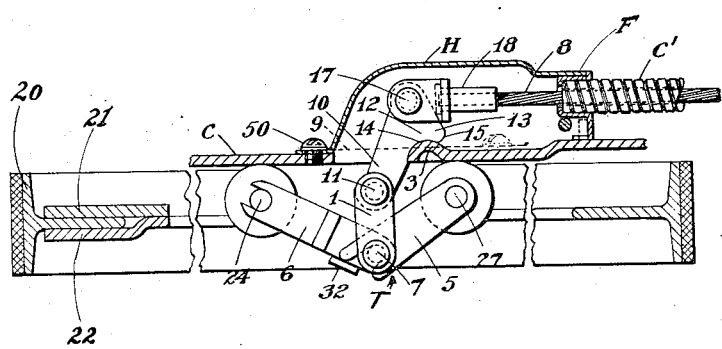
Figure 2 is a detail showing my preferred form of linkage in inoperative position.

As for the operation, when the cable is pulled with the parts in the position shown in Fig. 2, the straight pull at the outer end of the short arm of the bell crank exerts a force thereon, one of the components of which tends to pull the link 1 outwardly through the slot 9. As the link moves outwardly, the bell crank as a whole shifts about the upset portion 3. The link, of course, is free to float in accordance with the movement of the brake band. The limit of movement of the bell crank is determined by the stop 15 which may be of any length desired to effect the desired degree of movement. Thus, when the parts assume the position shown in Fig. 4, the toggle has been spread to the point where the secondary pivot between the arm 5 and connecting portion 32 becomes effective, and the shoe spread into engagement with the drum. Continued pulling on the cable after the parts of the toggle reach the secondary pivot, tends to straighten the linkage 1 and 2 and further flatten the toggle. When the tension on the cable is released, the springs 28 and 29 tend to return the shoe to idle position thus collapsing the toggle and returning the parts to the position shown in Fig. 1.

Figure 2A:
Fig. 2a is a view of a modified form of bell crank lever 2 showing a longer arm 10 than is illustrated in Fig. 2.

In the particular form of bell crank shown, the pins 11 and 17 are preferably spaced equidistant from the radial center about which the bell crank shifts, thus giving the bell crank a one to one ratio. However, the pivots may be spaced unequal distances to vary such ratio if desired as shown in Fig. 2a to effect a greater movement of the toggle in response to a predetermined pull on the actuating cable and, if desired to effect a lesser movement of the toggle, the arm 10 of the bell crank 2 may be made shorter as shown in Fig. 2.

As hereinbefore mentioned, a dust housing H is provided for enclosing and protecting the exposed parts of the spreading mechanism, such as the outer end of the bell crank 2 and the end of the flexible tension element connected thereto. This housing is made up of light durable stock and is substantially rectangular in cross section through its middle portion, Fig. 7, having an open side adjacent the apron. The main body of the housing is provided with tabs or ears 52 that are formed integral with opposite marginal edges thereof and are turned back so as to lie normal with the plane of the apron. These tabs may be bolted to the apron by means of bolts 51. An additional tab 53, Fig. 4, is formed integral with the rear wall and may also be bolted to the apron. Thus, it can readily be seen that by the removal of these bolts the dust-housing may conveniently be removed to permit access to the parts of the actuating mechanism enclosed thereby.

One end of the housing is bent to form a neck 54 that is substantially tubular in cross section in its upper portion as at 55 and rectangular in cross section in the lower half 56 thereof. The lower wall of the rectangular section is split longitudinally to provide two inturned flanges 57 separated by a slight clearance, the whole being adapted to be drawn together by a bolt 58 mounted in the lower section.

The tubular portion 55 is adapted for telescopic engagement with the tubular member 59 formed as a part of the conduit end fitting and adapted to be carried by the housing. This end fitting comprises a perforated member 60 adapted to overlie the open end of the housing and has spaced wings 61 formed on the lower end thereof that are adapted to engage with the walls of the housing defining the rectangular portion 56 to thereby prevent rotation or relative lateral movement with respect thereto. The tubular portion 59 is also split longitudinally as at 62 and is provided with a perforated end wall 63 against which the conduit end is adapted to abut, the remainder of the conduit within the tubular portion being snugly embraced by the wall sections. After the fitting is assembled on the end of the conduit it may be telescoped on the end of the housing and the bolt 58 drawn tight. This tends to compress the wall defining the tubular portion 55 of the neck 54 and collapses the tubular portion 58 of the fitting around the conduit end to effect the firm and snug embracing thereof. Of course, the flanges 57 act as stops to prevent the application of excessive pressure to the conduit.

This assembly is quite simple and is very effective in securely gripping the end of the conduit adjacent the drum. It is also effective in preventing the twisting or turning of the end inasmuch as the wings 61 prevent relative lateral or rotational movement of the fixture with respect to the neck of the housing.

The foregoing description is a description of a preferred form of my invention to which I do not care to be particularly limited, nor do I care to be limited in any manner other than by the claims appended hereto.

I claim:

1. In a brake, the combination of a drum, an apron, a brake shoe formed as a split band and having a radial flange, an anchor taking torque from said shoe, depending on the direction of drum rotation, a toggle arranged between the shoe ends for spreading the ends of said shoe apart, a link connected to the center of said toggle, a bell-crank lever having a shiftable pivot on the apron, said lever being connected to said link and means for actuating said bell-crank to spread said toggle.

2. In a brake, the combination of a drum, an apron, a brake shoe formed as a split ring and having a radial and a peripheral flange, an anchor for taking torque from either end of said shoe depending on the direction of drum rotation, a toggle arranged between the shoe ends for spreading said ends apart, means for actuating said toggle comprising a cable actuated linkage including a bell crank lever pivoted on the apron.

3. In a brake, the combination of a drum, an apron, a brake shoe formed as a split ring and having a radial and a lining supporting flange, an anchor arranged between the shoe ends for taking torque from either of said ends, means for spreading said shoe apart, and means for actuating said spreading means comprising a cable actuated linkage including a lever having a sliding pivot on an upset portion of the brake apron.

4. In a brake, the combination of an apron, a drum, a brake shoe having separable ends, an anchor for taking torque from either of said ends, a toggle mechanism located between the ends of said shoe for spreading said ends apart, a link connected to the center of said toggle, a bell crank having a long and a short arm connected to said link and having a sliding pivot on said apron, and a cable connected to the short arm of said bell crank.

5. In a brake, the combination of an apron, a brake drum, a shoe laterally disposed with relation to said apron, means for spreading said shoe apart comprising a toggle and cable actuated mechanism including a bell crank lever slidably and pivotally mounted on the apron for spreading said toggle.

6. In a brake, the combination of an apron, a brake drum, a shoe laterally disposed with relation to said apron, means for spreading said shoe apart comprising a toggle and cable actuated mechanism for actuating said toggle including a bell crank lever lying partly within and partly without the drum and having a sliding pivot on the brake apron.

7. In a brake, the combination of an apron, a floating brake shoe formed as a split ring and from T-section stock having a circumferentially adjustable end portion, an anchor for taking torque from either of said shoe ends, means for spreading said ends apart and actuating means for said spreading means including a bell crank lever slidably and pivotally mounted on the apron and connected exteriorly of said drum to a flexible pulling member.

8. In a brake, the combination of an apron, a drum, a floating friction band within said drum having separable ends, and having a portion thereof adjustable to vary the effective length thereof, an anchor disposed between the ends for taking the torque therefrom, a floating applying device arranged between the shoe ends and acting to spread the shoe ends apart to apply the brake, and a flexible tension element terminating exteriorly of said drum and lying alongside of said apron, means for connecting said flexible tension element to said floating applying device including a part having pivotal and slidable engagement with the apron, said flexible tension element being operatively connected to the said part exteriorly of the apron.

9. In a brake, the combination of an apron, a drum, a floating friction band within said drum having separable ends and having a portion adjustable to vary the effective length of the shoe, an anchor arranged between the shoe ends for taking the torque therefrom, a floating applying device arranged between the shoe ends and actuable to spread said ends apart to apply the brake, and a flexible tension element lying exteriorly of the drum and in the plane of the apron and operatively connected to said floating applying device exteriorly of said drum by means of a linkage including a lever having a sliding pivot on the apron.

10. In a brake, the combination of an apron, a drum, an anchor, a friction device disposed within said drum having separable ends, a means arranged between said separable ends for spreading said shoe, said means comprising a pair of arms actuating the friction device, a control for actuating said arms, said control comprising a link pivotally connected to one of said arms and operatively connected to a bell crank lever having a sliding pivot on the brake apron.

11. In a brake, the combination of an apron, a drum, an anchor, a friction device located within said drum formed from T-section stock and having separable ends, a toggle arranged between said ends, thrust pins for connecting said toggle to said friction device, one of said pins assuming an upright position when said band is in inoperative position and the other of said pins being set at an angle thereto.

12. In a brake, the combination of an apron, a drum, a floating brake shoe disposed laterally to said apron and being formed as a split band, means for spreading said shoe ends apart and means for connecting said spreading means to said shoe ends comprising thrust pins, one of which is disposed at an angle to the other when the shoe is in inoperative position and tends to lie substantially parallel therewith when said shoe is in operative position and expanded into frictional engagement with the drum.

13. In a brake, the combination of an apron, a brake drum, a brake shoe having separable ends, a toggle for spreading said shoe apart arranged between said ends, means for connecting said toggle to said brake shoe comprising thrust pins that are angularly disposed when the brake shoe is in a position of rest, and means for actuating said toggle comprising a cable operatively connected to said toggle and a bell crank slidably pivoted on said apron.

14. In a brake, an apron, a brake drum, a brake shoe having separable ends and a lining supporting flange, a toggle for spreading said shoe, thrust pins for connecting said toggle to said shoe, said pins being angularly disposed with relation to one another and means for actuating said toggle comprising a linkage including a bell crank lever having a sliding pivot on the apron and an actuating flexible tension element connected thereto exteriorly of said drum.

15. In a vehicle brake, the combination of a brake drum, an apron, a friction device located within said drum, having separable ends, actuating mechanism for said device, an anchor against which said ends abut, a cable for actuating said friction device, said cable extending through a conduit and being connected to said actuating mechanism exteriorly of the drum, a housing mounted on the apron and enclosing said point of connection, and means for securing said conduit to said housing, said means comprising a fitting encompassing the end of said conduit and clamped in said housing.

16. In a vehicle brake, the combination of a brake drum, an apron, a friction device located within said drum, having separable ends, actuating mechanism for said device, an anchor against which said ends abut, a cable for actuating said friction device, said cable extending through a conduit and being connected to said actuating mechanism exteriorly of the drum, a housing mounted on the apron and enclosing said point of connection, and means for securing said conduit to said housing, said means comprising a part adapted to encompass the end of said conduit and telescopically engage with said housing.

17. In a vehicle brake, the combination of a brake drum, an apron, a friction device located within said drum, having separable ends, actuating mechanism for said device, an anchor against which said ends abut, a cable for actuating said friction device, said cable extending through a conduit and being connected to said actuating mechanism exteriorly of the drum, a housing mounted on the apron and enclosing said point of connection, and means for securing said conduit to said housing, said means comprising a part engaging the end of said conduit and insertable into said housing and means for clamping said housing therearound.

18. In a vehicle brake, the combination of a brake drum, an apron, a friction device located within said drum, having separable ends, actuating mechanism for said device, an anchor against which said ends abut, a cable for actuating said friction device, said cable extending through a conduit and being connected to said actuating mechanism exteriorly of the drum, a housing mounted on the apron, and enclosing said point of connection, and means for securing said conduit to said housing, said means comprising a part engaging the end of said conduit and insertable into said housing, being held therein by clamping the walls of said housing therearound.

19. In a vehicle brake, the combination of a brake drum, an apron, a friction device located within said drum, having separable ends, actuating mechanism for said device, an anchor against which said ends abut, a cable for actuating said friction device, said cable extending through a conduit and being connected to said actuating mechanism exteriorly of the drum, a housing mounted on the apron and enclosing said point of connection, and means for securing said conduit to said housing, said means including a part having a tubular portion for encompassing said conduit and telescopically engaging with said housing.

20. A brake comprising, in combination, a friction element having separable ends, an apron adjacent said friction element, means for separating the ends of said friction element including a part pivotally and bodily slidably engaging said apron, and means engaging said part for actuating said means for separating the ends of the friction element.

21. A brake comprising, in combination, a drum, an apron having an anchor pin mounted therein, a friction device having separable ends abutting against said anchor, means for spreading said ends apart, a flexible cable for actuating said means, means between said cable and said spreading means for transmitting force therebetween, said means including a lever having a long arm and a short arm, said short arm being connected to said cable, said long arm being associated with the spreading means, said lever being pivoted on the apron.

22. In combination with a brake comprising a brake shoe having separable ends and means for separating the ends of said shoe, a pair of thrust pins for connecting said means to said shoe, said thrust pins being mounted one at each end of said shoe and being angularly related when said shoe is in inoperative position and in substantial parallelism when said shoe is in operating position.

23. A brake comprising a drum, an apron, a brake shoe disposed within said drum in combination with a thrust pin carried by said brake shoe, said thrust pin having a groove therein, said brake shoe having a portion co-operating with said groove for supporting said thrust pin.

24. A brake comprising, in combination, a brake drum, an apron, a brake shoe having separable ends located within said drum, said ends having tubular openings normal to the horizontal axis of the brake shoe, thrust pins mounted in said tubular openings, said thrust pins being supported through engagement with a deformed portion of the wall of said openings.

25. In a brake, the combination of an apron, a drum, a brake shoe disposed laterally to said apron and being formed as a split band, means for spreading said shoe ends apart, means for connecting said spreading means to said shoe ends comprising thrust pins, one of which is disposed at an angle to the other when the shoe is in inoperative position, said thrust pins being supported by said shoe ends and being secured thereto by deforming a portion of the shoe therearound.

26. In a brake, the combination of an apron, a brake drum, a brake shoe having separable ends, means for spreading said shoe ends apart, thrust pins for connecting said means to the ends of said shoe, said thrust pins being angularly related one to the other when the shoe is in inoperative position and which tend to lie substantially parallel when the shoe is in operative position, said shoe ends having portions adapted to receive and encompass said thrust pins, said pins being secured in position by deforming a portion of said shoe therearound.

27. In a brake, an apron, a brake drum, a brake shoe having separable ends, means for spreading said shoe, thrust pins for connecting said means to said shoe, said pins being angularly disposed with relation to one another when said shoe is in brake release position and in substantial parallelism when said shoe is in brake applying positions.

28. In a brake, an apron, a brake drum, a brake shoe having separable ends, means for spreading said shoe, thrust pins for connecting said means to said shoe, said pins being angularly disposed with relation to one another when said shoe is in one position and in substantially parallelism when said shoe is in another position, means for actuating said spreading means including a lever pivotally connected to the apron and a flexible force transmitting device connected to said means.

29. In combination with a vehicle brake having an apron, a housing secured to said apron having a deformable neck, a flexible force transmitting device including a conduit located within the neck of said housing and means for securing said conduit to said housing by clamping said neck therearound.

30. In combination with a vehicle brake having an apron, a brake shoe and means for actuating said brake shoe having a part lying exteriorly of said apron, of a housing overlying said part and having an open end with a polygonal portion, a flexible force transmitting device including a flexible tension element connected to said part, and a conduit lying within the open end of said housing and means for clamping the end of said housing to said conduit, said conduit having a part to engage the polygonal portion to prevent accidental turning of the conduit upon the housing.

RUSSELL S. BEGG.